United States Patent
Mezei et al.

(10) Patent No.: US 11,031,141 B2
(45) Date of Patent: Jun. 8, 2021

(54) PROVIDING A NEUTRON SOURCE BY DIRECTING A BEAM ONTO A TARGET IN A NUCLEAR REACTOR TO EMIT NEUTRONS FROM THE REACTOR

(71) Applicants: EUROPEAN SPALLATION SOURCE ERIC, Lund (SE); MIFLER CONSULTING KFT., Martonvásár (HU)

(72) Inventors: Ferenc Mezei, Budapest (HU); Luca Zanini, Malmö (SE)

(73) Assignees: European Spallation Source Eric, Lund (SE); Mifler Consulting KFT, Martonvasar (HU)

( * ) Notice: Subject to any disclaimer, the term of this patent is extended or adjusted under 35 U.S.C. 154(b) by 362 days.

(21) Appl. No.: 16/302,052

(22) PCT Filed: May 19, 2016

(86) PCT No.: PCT/EP2016/061268
§ 371 (c)(1),
(2) Date: Nov. 15, 2018

(87) PCT Pub. No.: WO2017/198303
PCT Pub. Date: Nov. 23, 2017

(65) Prior Publication Data
US 2019/0189294 A1    Jun. 20, 2019

(51) Int. Cl.
*G21C 23/00*    (2006.01)
*G21C 1/30*    (2006.01)
*G21G 1/02*    (2006.01)

(52) U.S. Cl.
CPC .............. *G21C 1/30* (2013.01); *G21C 23/00* (2013.01); *G21G 1/02* (2013.01); *Y02E 30/30* (2013.01)

(58) Field of Classification Search
CPC ............. G21C 1/30; G21C 23/00; G21G 1/02
(Continued)

(56) References Cited

U.S. PATENT DOCUMENTS 4,582,667 A    4/1986    Bauer
5,160,696 A    11/1992   Bowman
(Continued)

FOREIGN PATENT DOCUMENTS

CN    104167226 A    11/2014
DE    3031 107 A1    3/1982
(Continued)

OTHER PUBLICATIONS

Jan. 19, 2017 International Search Report issued in International Patent Application No. PCT/EP2016/061268.
(Continued)

*Primary Examiner* — Jack W Keith
*Assistant Examiner* — Daniel Wasil
(74) *Attorney, Agent, or Firm* — Oliff PLC (57) ABSTRACT

A method including providing a nuclear reactor neutron source that includes an enclosure delimiting a chamber, a nuclear reactor core arranged inside the chamber and configured to produce neutrons from a nuclear fuel element inside the nuclear reactor core; installing a beam generator arranged to generate a beam directed into the chamber; and installing, inside the chamber, a target arranged to eject neutrons upon impact of the beam such that neutrons are ejected from the target and emitted from the chamber.

12 Claims, 8 Drawing Sheets

(58) Field of Classification Search
USPC .................... 376/156, 192, 194, 340, 347
See application file for complete search history.

(56) References Cited

U.S. PATENT DOCUMENTS

| | | | | |
|---|---|---|---|---|
| 5,513,226 | A | * | 4/1996 | Baxter ................ G21C 1/30 376/194 |
| 5,774,514 | A | | 6/1998 | Rubbia |
| 2007/0064859 | A1 | | 3/2007 | Bokov et al. |
| 2013/0028364 | A1 | * | 1/2013 | Rubbia ................ G21C 1/30 376/215 |
| 2017/0098483 | A1 | * | 4/2017 | Zhan ................... G21C 1/30 |

FOREIGN PATENT DOCUMENTS

| | | |
|---|---|---|
| GB | 978 499 A | 12/1964 |
| WO | 95/12203 A1 | 5/1995 |
| WO | 99/59158 A1 | 11/1999 |
| WO | 2008/100269 A2 | 8/2008 |
| WO | 2013/084004 A1 | 6/2013 |
| WO | 2014/128457 A1 | 8/2014 |
| WO | 2014/204536 A2 | 12/2014 |

OTHER PUBLICATIONS

Jan. 19, 2017 Written Opinion of the International Searching Authority issued in International Patent Application No. PCT/EP2016/061268.

* cited by examiner

PROVIDING A NEUTRON SOURCE BY DIRECTING A BEAM ONTO A TARGET IN A NUCLEAR REACTOR TO EMIT NEUTRONS FROM THE REACTOR

TECHNICAL FIELD

The present invention relates to a method for providing a neutron source.

BACKGROUND

Nuclear power stations transform nuclear energy into heat which may be passed to a working fluid running through and driving turbines to produce electricity. The heat is generated by nuclear fission reactions created by nuclear fuel elements within a nuclear reactor core. The nuclear reactor core is used to initiate and control a sustained nuclear chain reaction. The principal part of the nuclear reactor core is the active zone, where the nuclear fuel elements are situated and the nuclear reaction takes place. More specifically, within the active zone heavy nuclides of the nuclear fuel element undergo fission reaction into lighter ones, called fission products upon absorption of a neutron. Each fission event releases large amounts of energy, in the order of 200 MeV, in the form of kinetic energy of the fission fragments, gamma rays and several fast neutrons. The nuclear fuel element may, for example, be U-233, U-235, Pu-239 or Pu-241. To increase the efficiency of the fission reactions, the nuclear fuel elements may be arranged inside a neutron moderator, such as light or heavy water, or graphite arranged to thermalize neutrons for which the fission reaction has a maximum cross-section.

Nuclear reactors may also serve other purposes than energy production such as production of neutron beams to be used in fundamental and applied research, material testing, characterization and analysis, neutron radiography, isotope production, etc. Many of these experiments or, procedures are based on neutrons being scattered from the material or system under study. The use of neutron scattering has many advantages. Neutron interaction with matter is confined to the short-range nuclear and magnetic interaction. The neutrons usually penetrate well through matter, due to their small interaction probability, making neutrons a unique probe for investigating bulk condensed matter. Neutrons can also be used as a surface probe, since the neutrons can be reflected by some surfaces when incident at glancing angles. Hence, neutrons may be both a bulk and a surface probe for investigating structures and dynamics. A few advantages are: Neutrons interact through short-range nuclear interactions and with the atomic magnetic moments; neutrons are penetrating matter efficiently and do not heat up, or damage most samples. Neutrons are good probes for investigating structures in condensed matter as neutron wavelengths are comparable to atomic sizes and interatomic spacing. Neutron energies are comparable to normal mode energies in materials, for example, phonon modes. Neutrons are good probes to investigate the dynamics of solid state and liquid materials. Neutron interaction with hydrogen and deuterium are widely different making the deuterium labelling method an advantage. The large interaction of neutrons with protons makes the neutron a very sensitive probe of hydrogen in many environments, such as living matter.

As of today, the majority of neutron sources for neutron scattering research purposes are based on nuclear reactors. Fission fragments are heavy and remain inside the nuclear fuel elements therefore producing the major source of heat while energetic gammas and fast neutrons penetrate most everything and are carefully shielded against. Gamma rays and fast neutrons are a nuisance to neutron scattering work and are, as much as possible, not allowed to reach the detectors. After being slowed down by the moderator materials, the neutrons are used to sustain the fission reaction as well as beams extracted through beam tubes for low energy, i.e. hot, thermal and cold neutron scattering.

There is, however, a need to improve the efficiency at which the neutrons are produced. There is also a demand for brighter neutron sources producing a higher flux of neutrons. It is desirable to reduce the inventory of radioactive and fissionable materials to increase safety and to reduce proliferation concerns.

SUMMARY OF THE INVENTION

In view of the above, it is an object of the present invention to provide an improved neutron source. The method further takes advantage of pre-existing infrastructure of a nuclear reactor based neutrons source reducing costs associated with providing the improved neutron source. A reduction of the inventory of radioactive and fissile material may further be provided.

According to an aspect of the invention a method for providing a neutron source is provided. The method comprising: providing a nuclear reactor neutron source, the nuclear reactor neutron source comprising: an enclosure delimiting a chamber, a nuclear reactor core arranged inside the chamber, the nuclear reactor core is configured to produce neutrons from a nuclear fuel element inside the nuclear reactor core; installing a beam generator arranged to generate a beam directed into the chamber; and installing, inside the chamber, a target arranged to eject neutrons upon impact of the beam such that neutrons are ejected from the target and emitted from the chamber.

The term "beam generator" shall in this context be construed as a generator configured to generate a beam of charged particles or a beam of electromagnetic radiation. The charged particles are selected from the group of charged particles comprising ions, electrons and positrons. Non-limiting examples of ions are protons and deuterons.

The beam generator may be an accelerator.

Non-limiting examples of energy of the beam are 50-500 keV for electromagnetic radiation, 10-100 MeV for electrons, and 1-3000 MeV for ions.

An advantage of the method is that a more efficient neutron source may be provided. The amount of energy needed for forming the neutrons may thereby be reduced. A larger flux of neutrons may, moreover, be provided. Pulsing of the provided neutrons may further be provided. By utilizing parts of a nuclear reactor neutron source when providing of the neutron source additional advantages are obtained. The method substantially reduces the investment costs by the conversion of the nuclear reactor neutron source, i.e. the "nuclear" into a "non-nuclear", that is non-fission based, neutron source. The method further allows for re-use of infrastructure such as primarily buildings, shielding, beam lines, irradiation ports, neutron scattering instruments or parts of neutron scattering instruments and other experimental or production stations for neutron beam use, utilities, and safety and security functions.

The method may further comprise removing the nuclear fuel element of the nuclear reactor core from the chamber.

The replacement of the nuclear reactor source by the non-nuclear neutron sources reduces operational cost and enhances security. The time and cost needed for constructing a non-fission based neutron source may further be reduced. This since at least a portion of expenses of the decommissioning, dismantling and disposal of the nuclear reactor source is reduced. To this end, the provided neutron source allows for cheaper operation, including the reduced costs for nuclear fuel elements, a longer lifetime, i.e. extending the lifetime of the nuclear reactor neutron source. A larger flexibility in providing different neutron fluxes is further provided. This is advantageous as different experiments and applications require different neutron fluxes, even a lower flux source may be advantageous as and will be seen as an improved, if it has longer lifetime, lower costs, lower gamma ray production.

The provided nuclear reactor neutron source may comprise a neutron beam outlet arranged through the enclosure to provide a neutron passage for neutrons from the chamber and the act of installing the target may comprise arranging the spallation target such that neutrons ejected from the target are emitted from the chamber via the neutron passage.

An efficient output of neutrons from the chamber may thereby be achieved. Pre-existing infrastructure such as experimental station for conducting neutron scattering experiments or parts of such experiments may thereby be reused. Hence, the costs associated with providing the improved neutron source, are thereby reduced.

The act of removing the nuclear fuel element of the nuclear reactor core from the chamber may form a void inside the chamber, and the act of installing the target may comprise arranging the target inside the void.

The target may thereby be placed at a centre location that, for example, inside the active zone of the provided nuclear reactor core of the nuclear reactor neutron source. The freed space may efficiently be used for installing the target.

The act of removing the nuclear fuel element of the nuclear reactor core may comprise removing the nuclear reactor core.

The chamber of the provided nuclear reactor neutron source may further comprise a moderator, and the act of installing the target may comprise arranging the target inside the moderator. The moderator, also referred to as a neutron moderator, may thereby slow down the neutrons ejected from the target allowing for low neutron energy, i.e. hot, thermal and cold neutron scattering. In nuclear reactor neutron sources the moderator(s) that primarily assure the maintenance of the chain reaction are called "moderator", they may have large volumes of several m$^3$ and they operate in the temperature range between room temperature and typically smaller than 100° C. This moderator temperature range is called "thermal". Moderators that are designed to emit slow neutrons of a particular energy range are called "source" and they are typically of volumes between 1-50 litres. A "hot source" has temperature above 1000° C. and a "cold source" below 150° C. In spallation and compact neutron sources these structures are called "hot moderator" and "cold moderator", respectively, and there may also be "thermal moderators" installed, with typical volumes of 1-5 litre.

The chamber of the provided nuclear reactor neutron source may further comprise a reflector, and the act of installing the target may comprise arranging the target inside the reflector.

The reflector is arranged to reduce neutrons from leaking out of the enclosure, by being reflected back into the centre of the nuclear reactor core. A more flexible arrangement of the target may thereby be achieved. The reflector may enhance the intensity of the slow neutrons emitted by the moderators by reflecting neutrons into the moderators that would otherwise escape without interacting with the moderators.

In nuclear reactor neutron sources the same structure may have both the function of moderator and reflector and called either moderator or reflector as above or "moderator-reflector". Water moderator and moderator-reflector is often also used for cooling the nuclear fuel elements.

The provided nuclear reactor neutron source may further comprise an additional neutron beam outlet arranged through the enclosure to provide an additional neutron passage for neutrons from the chamber, and the act of installing of the beam generator may comprise directing the beam into the chamber via the additional neutron passage onto the target.

The use of the existing additional neutron passage reduces cost and provides an efficient passage for the beam to reach the target.

The enclosure of the provided nuclear reactor neutron source may further comprise a thermal column or an access shaft, and the act of installing of the beam generator comprises directing the beam into the chamber via the thermal column or the access shaft onto the target.

The use of the existing column or an access shaft reduces cost and provides an efficient passage for ions to reach the target.

The act of installing a beam generator may comprise installing the beam generator or a portion of the beam generator inside the chamber. A more compact neutron source may thereby be provided.

The nuclear reactor core of the provided nuclear reactor neutron source may comprise fissile material.

The moderator of the provided nuclear reactor neutron source may comprise a material selected from the group consisting of $H_2O$, $D_2O$, liquid or solid hydrogen or deuterium, liquid or solid methane, mesithelene, and ice.

The reflector of the provided nuclear reactor neutron source may comprise a material selected from the group consisting of graphite, beryllium, steel, tungsten carbide, nickel, tungsten, heavy water, lead or alloys of these.

The act of installing a target may comprise installing a target comprising a material selected from the group consisting of mercury, tantalum, lead, liquid lead-bismuth alloy, tungsten, rhenium, or alloys of these, or beryllium or lithium.

The act of installing a beam generator arranged to generate a beam directed into the chamber, may comprise installing the beam generator to form part of a spallation neutron source for providing the neutrons.

The act of installing a beam generator arranged to generate a beam directed into the chamber, may comprise installing the beam generator to form part of a compact neutron source for providing the neutrons.

The wording "spallation" should be construed as a nuclear reaction process in which light particles such as neutrons are ejected as the result of bombardment as by high-energy particles such as ions, e.g. protons. Spallation based replacement can be applied in a higher power range than other particle or lower energy (<200 MeV) accelerator based systems.

As a non-limiting example, 1-GeV proton is capable of producing approximately 25 neutrons from a target such as lead, with heat deposition in the target of about half of the proton beam power—meaning one order of magnitude less heat must be dissipated than in a fission reaction producing the same time-averaged neutron flux. Hence a more effective production of neutrons is achieved.

"Compact neutron sources" comprise beam generators arranged to generate a beam, of radiation or ions, with an energy range of 1-100 MeV. The generated beam may, for example, comprise protons which when colliding with a target create light particles such as neutrons. Advantages of the compact neutron sources are that have a small footprint, typically in the range of 3-20 m long and 20-60 cm in diameter. The length can be longer, if the energy is higher, say up to 50 m to reach 100 MeV. The compact neutron sources also considerable cheaper, to construct and handle, than for instance reactor based neutron sources. By use of a compact neutron source, additional construction work as for example to strengthen the shielding system of a reactor based neutron source is reduced in extent.

The chamber of the provided nuclear reactor neutron source may further comprise a hot or cold neutron source, and the act of installing a target may comprise arranging the target adjacent to the hot or cold neutron source.

Neutrons ejected from the target may thereby interact with the cold neutron source. After interaction the typically Maxwellian neutron spectral distribution may thereby be shifted to lower energies by neutrons slowing down through inelastic scattering processes with the cold neutron source.

The cold neutron source may be arranged within the peak flux position within the reflector region.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated or reduced for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

In the following a method for providing a neutron source is described with reference to FIG. 1 and FIGS. 3-7. FIG. 2 illustrates a nuclear reactor neutron source according to prior art.

Figure 1:
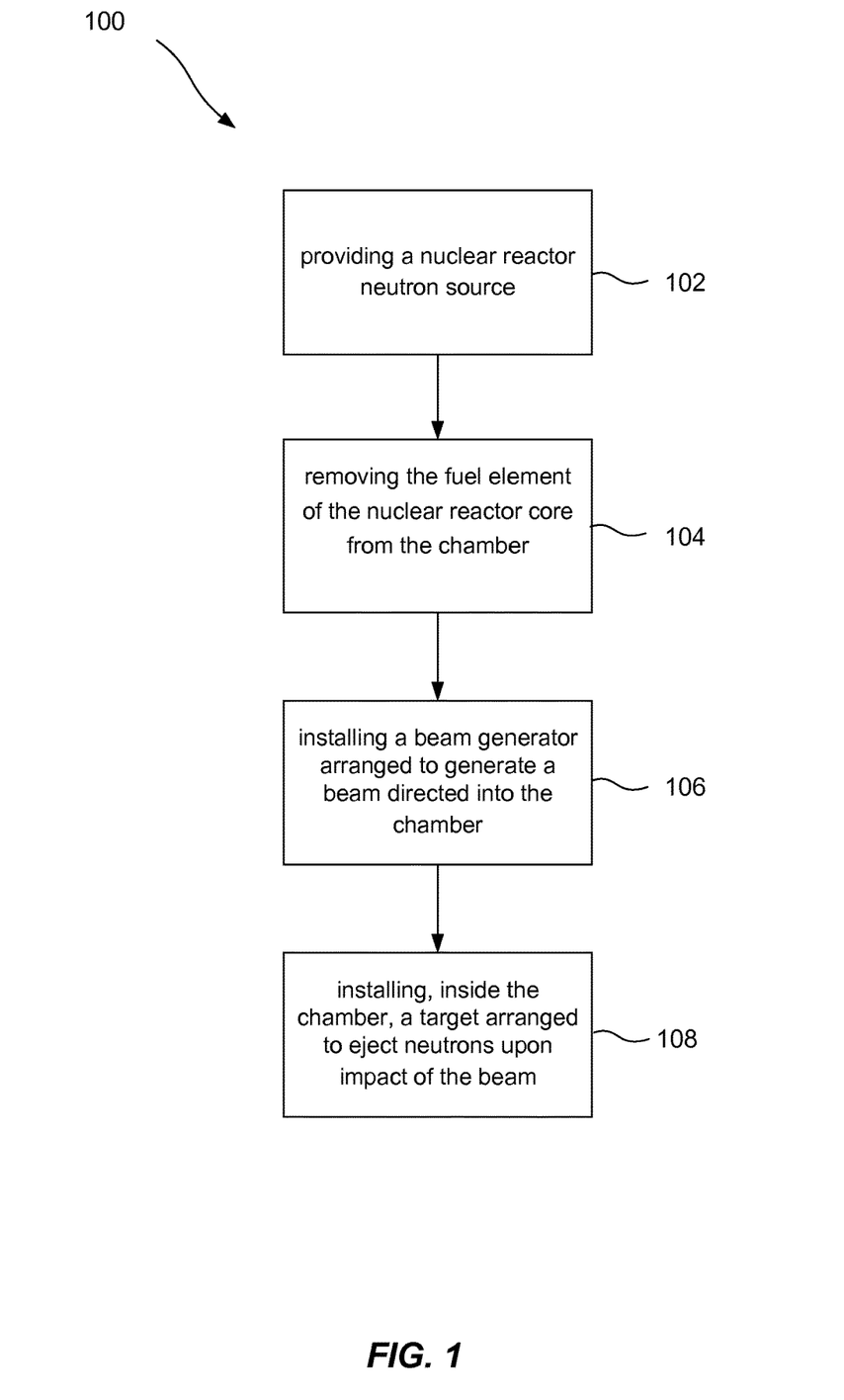
FIG. 1 shows a flow chart illustrating a method for providing a neutron source.
Figure 2:
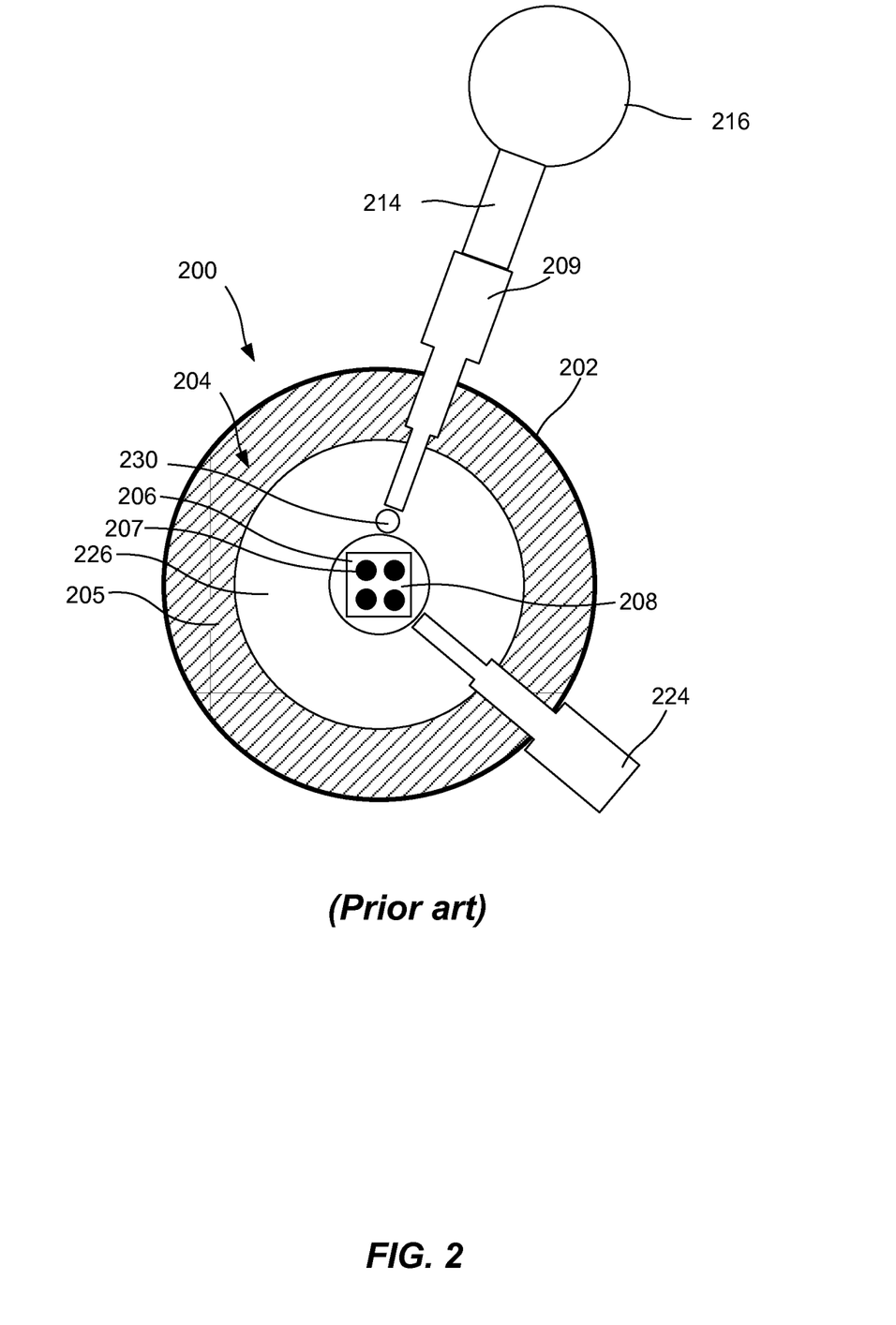
FIG. 2 illustrates a nuclear reactor neutron source for providing the neutron source according to prior art.
Figure 3:
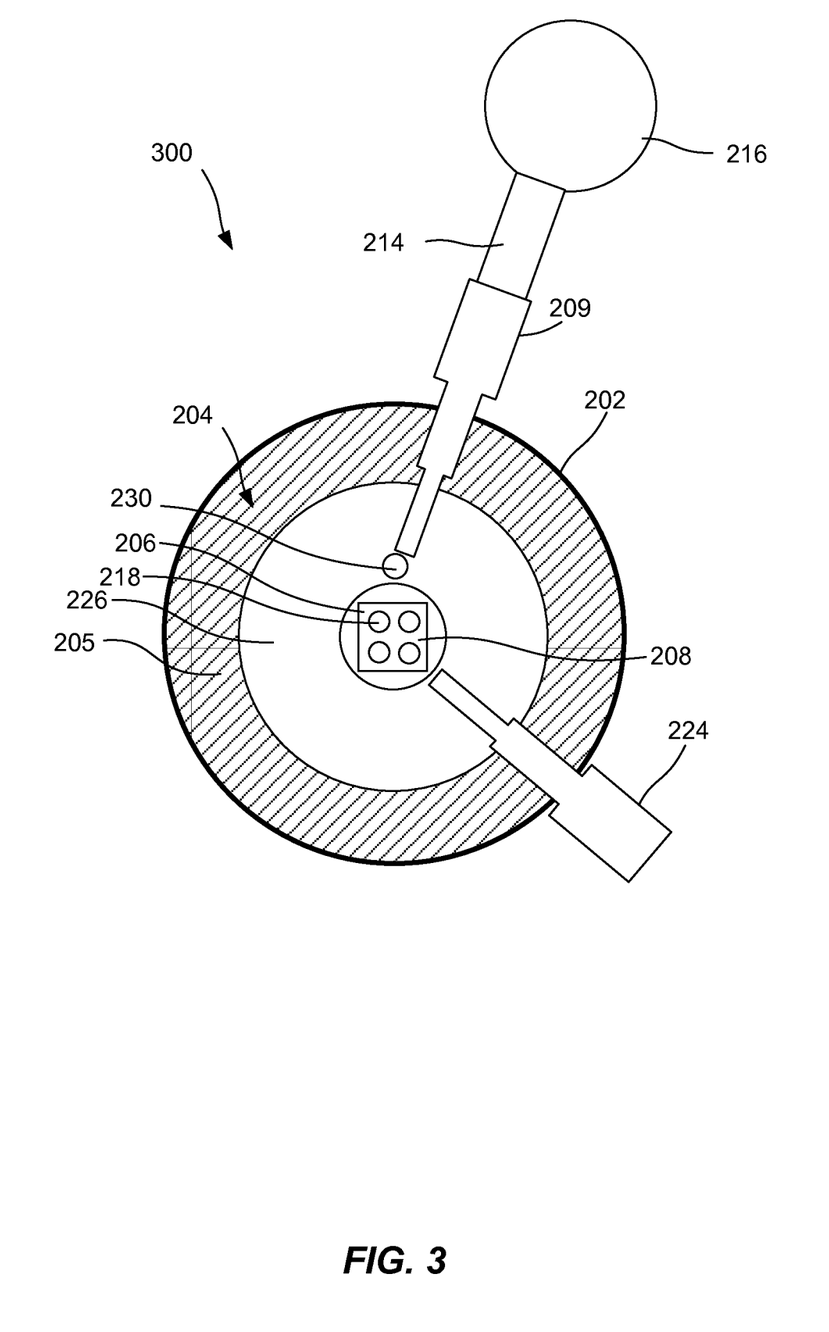
FIG. 3 illustrates a pre-stage of a neutron source.

FIG. 1 shows a flow chart illustrating the method 100 for providing a neutron source. FIG. 3 illustrates a pre-stage of the neutron source.

FIGS. 4-7, illustrates neutron sources provided by the method 100.

Referring to FIGS. 1 and 2, the method 100 comprises the act of providing 102 a nuclear reactor neutron source 200. FIG. 2 illustrates a schematic top view of a nuclear reactor neutron source according to prior art. The nuclear reactor neutron source 200 comprises an enclosure 202 delimiting a chamber 204. A shielding 205 is further provided to prevent undesired radiation such as neutrons and gamma rays to exit through the enclosure 202 of the chamber 204. A for a user securer environment surrounding the nuclear reactor neutron source is thereby provided. A nuclear reactor core 206 is arranged inside the chamber 204. The nuclear reactor core 206 is configured to produce neutrons from a nuclear fuel element 207 inside the nuclear reactor core 206, i.e. heavy nuclides of the nuclear fuel element 207, comprising a fissile material, may undergo a fission reaction into lighter ones, so called fission products upon absorption of a neutron. Each fission event releases large amounts of energy in the form of kinetic energy of the fission fragments, gamma rays and neutrons. Hence, the nuclear fuel element 207 forms an active part of the nuclear reactor core 206. The nuclear reactor core 206 may thereby be referred to as an active zone.

The chamber 204 of the provided nuclear reactor neutron source 200 may further comprise a moderator 208. The moderator 208 is arranged to slow down the neutrons ejected from the nuclear fuel element 207. The nuclear reactor neutron source 200 may further comprise a neutron beam outlet 209 arranged through the enclosure 202 to provide a neutron passage for neutrons from the chamber 204. An output of neutrons, generated by the fission events, from the chamber 204 may thereby be achieved.

The method 100 may comprise the action of removing 104 the nuclear fuel element 207 of the nuclear reactor core 206 from the chamber 204, see the pre-stage 300 of the neutron source in FIG. 3. As a non-limiting example, the nuclear reactor core 206 comprises a plurality of nuclear fuel elements 207, which are all removed in the action of removing 104. The skilled person in the art, however, realizes that one or more of the fuel elements may be removed in the act of removing. It should further be noted that the nuclear reactor core 206 may be removed in the act of removing 104, not shown.

It should further be noted that operation and decommissioning of nuclear reactor neutrons sources are internationally regulated and supervised by the International Atomic Energy Agency for both safety and worldwide non-proliferation purposes. Hence, by removing 104 the nuclear fuel element 207 or the nuclear reactor core 206 from the chamber 204 a reduction of nuclear fuel elements and other radioactive materials within the chamber 204 is achieved. In other words, a fissile material of the nuclear reactor core is thereby removed. A neutron source requiring less governmental inspection and regulations may thereby be provided.

Figure 4:
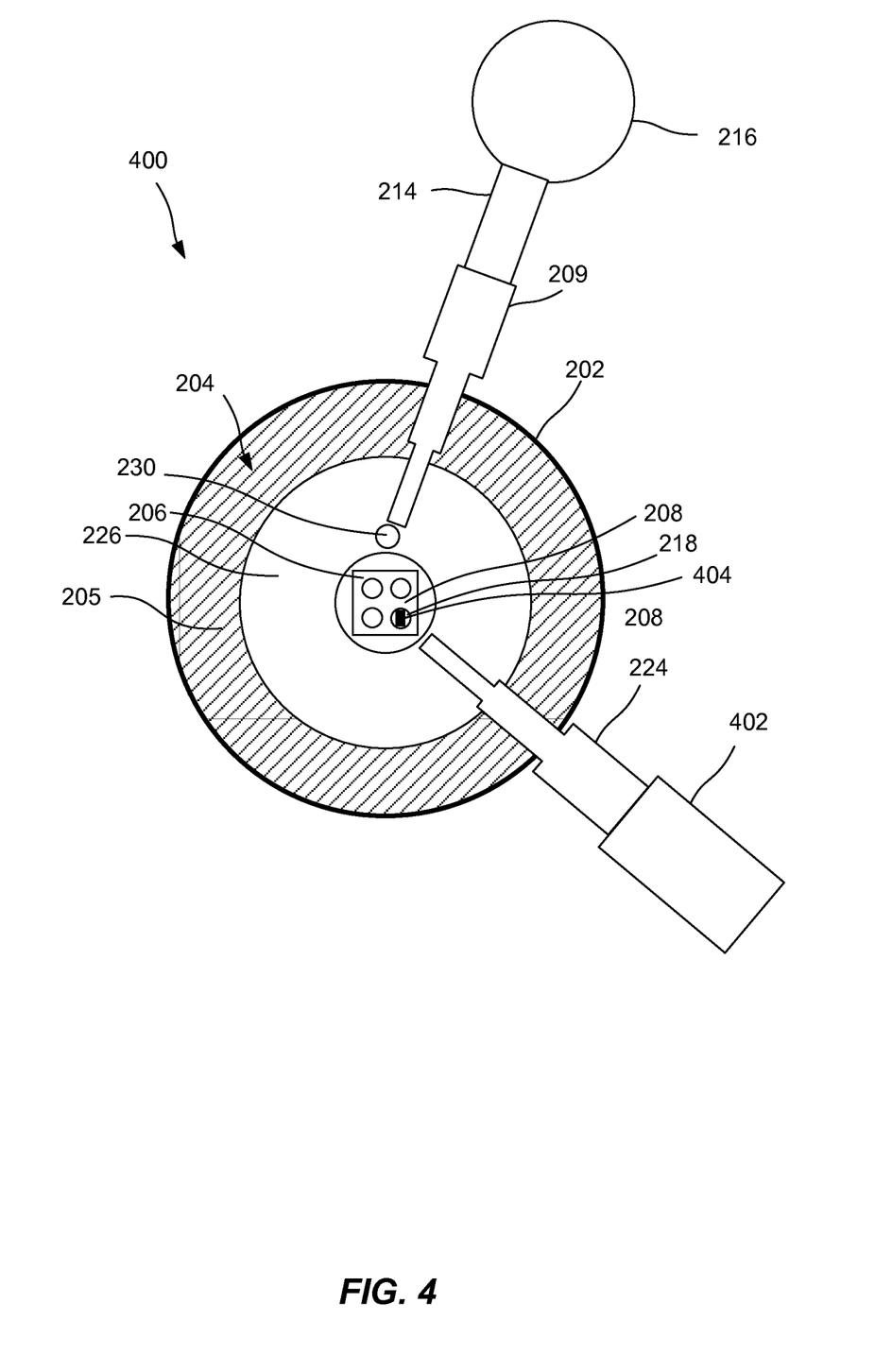
FIG. 4 illustrates a neutron source.
Figure 5:
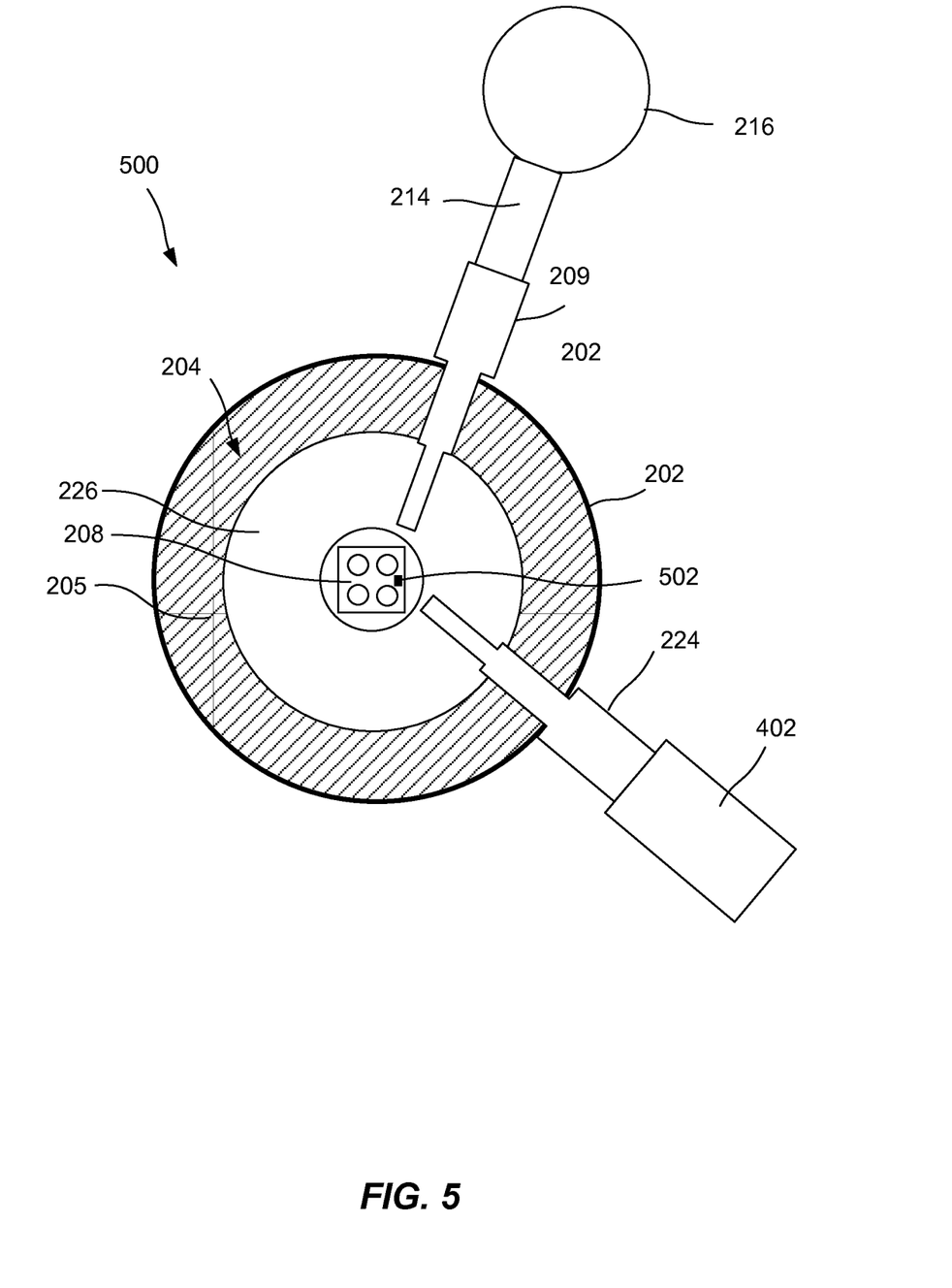
FIG. 5 illustrates a neutron source.

The method 100 further comprises the act of installing 106 a beam generator 402, see FIG. 4. The beam generator 402 is arranged to generate a beam of charged particles or a beam of electromagnetic radiation and to direct the beam into the chamber 204.

The beam generator may, for example, form part of a spallation neutron source or a compact neutron source as will be described further below.

The method 100 further comprises the action of installing 108, inside the chamber 204, a target 404 arranged to eject neutrons upon impact of the beam such that neutrons are ejected from the target 404 and emitted from the chamber 204. The provided neutron source 400 is illustrated in FIG. 4. The neutrons generated may be emitted from the chamber 204 via the neutron beam outlet 209. The generated neutrons may, moreover, be directed via a beam line 214 to an experimental station 216 for conducting neutron scattering experiments or investigations. The beam line 214 and the experimental station 216 may form parts of the pre-existing infrastructure of the nuclear reactor neutron source 200 which then may be reused. Hence, a cost reduction is associated with providing the improved neutron source. A new beam line and/or an experimental station may alternatively be provided.

In the above description the act of removing 104 at least the nuclear fuel element 207 of the nuclear reactor core 200 from the chamber 204 forms a void 218 inside the chamber 204, see FIGS. 3 and 4. The act of installing 106 the target 404 may further comprise arranging the target 404 inside the void 218. The target 404 may thereby be arranged at the location where neutrons are generated in the nuclear reactor neutron source 200. Hence, the provided neutron source may efficiently take advantage of the design of the reactor core neutron source from the target. The target 404 may be arranged at other locations as will be described below.

The provided nuclear reactor neutron source 200 may also comprise an additional neutron beam outlet 224 arranged through the enclosure 202 to provide an additional neutron passage for neutrons from the chamber 204 see FIG. 2-4. The act of installing 106 of the beam generator 402 may then comprise directing the beam into the chamber 204 via the additional neutron passage onto the target 404. The use of an existing neutron beam outlet 224 reduces cost and provides an efficient passage for the beam to reach the target 404.

For the purpose of neutron scattering investigations neutrons having different kinetic energies may be used. The neutron energies may be referred to as epithermal, >500 meV, hot, about 100 meV-500 meV, thermal, about 10-100 meV, and cold, <10 meV. Hot, thermal and cold neutrons may be referred to as "slow" neutrons.

For investigating materials by neutron scattering techniques the slow neutrons are preferably used. As non-limiting examples, the generated neutrons from the target may be emitted from the moderators, the moderators having different temperatures, typically but not limiting to 25-40 K hydrogen or methane for cold, 300 K water for thermal and 2000 K graphite for hot neutrons. Here the word "moderator" is used in the sense of slowing down neutrons for use in emitted beams, which are described by the word "source" for reactor neutron sources, e.g. "cold source". We note that the moderator, the any of the controlled temperature "sources" of the originally provided nuclear reactor neutron source may be used as moderators for the beam generator based neutron production according to this invention. Epithermal neutrons up to several MeV energies may also be used, for example for the purposes of radiography of massive objects, such as concrete structures and emulating cosmic radiation conditions for testing electronic equipment. Generally, most epithermal neutrons are directly ejected by the target, but may also be present in the spectra of the neutrons emitted from the moderators. A reduction of epithermal neutrons and gamma radiation neutron passage may thereby be provided. This arrangement may, for example, be desirable for nuclear reactor neutron source having a split-core geometry whereby the neutron passage is provided by a thermal neutron beam tube which is not directed at the nuclear fuel elements directly.

Thus, the chamber 204 of the provided nuclear reactor neutron source 200 may further comprise a moderator 208 as discussed above. The act of installing 108 a target may then comprise arranging a target 502 inside the moderator 208, see the provided neutron source 500 of FIG. 5. The moderator 208 may thereby slow down the neutrons ejected from the target 502 allowing for low energy, i.e. thermal and cold, neutron scattering. The neutron beam outlet 209 and the additional neutron beam outlet 224 are for clarity illustrated at different locations than the ones shown in FIG. 2. The skilled person in the art realizes that the neutron beam outlet 209 and the additional neutron beam outlet 224 may be the same as in FIG. 2 or be formed by additional neutron beam outlets of the nuclear reactor neutron source 200. Alternatively, new neutron beam outlets may be provided to form the neutron source 500 of FIG. 5. To this end, the beam generator 402 may be arranged to direct the beam into the chamber 204 and onto the target 502 through different neutron passage.

The chamber 204 of the provided nuclear reactor neutron source 200 may further comprise a reflector 226. The act of installing 108 a target may then comprise arranging the target 602 inside the reflector 226, see the provided neutron source 600 of FIG. 6.

The neutron beam outlet 209 and the additional neutron beam outlet 224 are here for clarity illustrated at different locations than in the previous figures. The skilled person in the art realizes that the neutron beam outlet 209 and the additional neutron beam outlet 224 may be the same as in, for example, FIG. 5 or be formed by other neutron beam outlets of the nuclear reactor neutron source 200. Alternatively, new neutron beam outlets may be provided to form the neutron source 600 of FIG. 6. To this end, the beam generator 402 may be arranged to direct the beam into the chamber 204 and onto the target 602.

Figure 6:
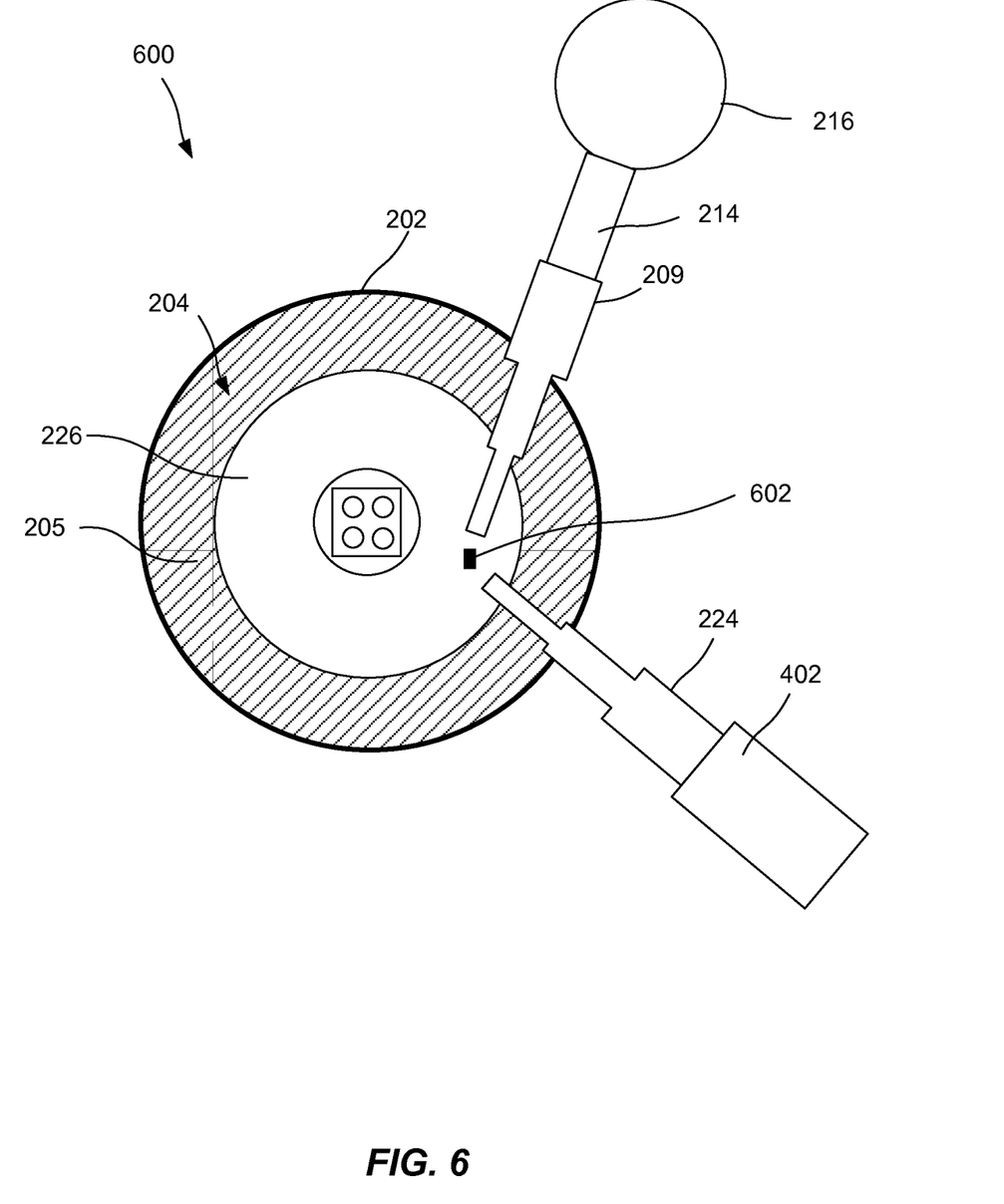
FIG. 6 illustrates a neutron source.

The reflector 226 may enhance the intensity of slow neutrons emitted by a target directly, or via the moderator 208 by reflecting neutrons back into the moderator 208 that would otherwise escape the chamber 204 without interacting with the moderator 208. A larger population of neutrons may thereby be provided for experiments such as neutron scattering or other neutron based investigations.

Figure 7:
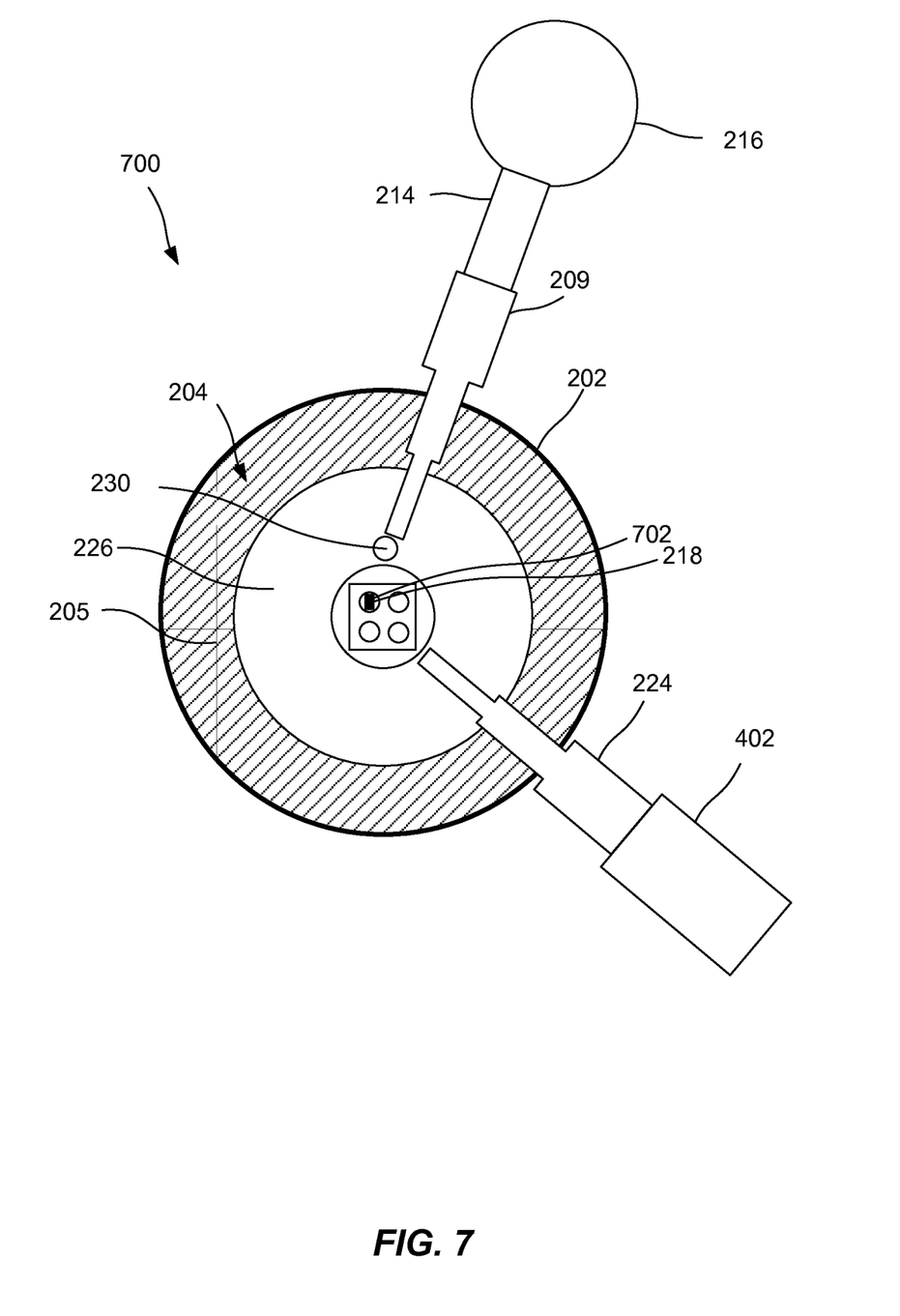
FIG. 7 illustrates a neutron source.

The chamber 204 of the provided nuclear reactor neutron source 200 may further comprise a hot or cold neutron source 230, see for example FIGS. 2 and 7. The act of installing 108 a target 702 may comprise arranging the target 702 adjacent to the hot or cold neutron source 230. The target 702 may, for example, be arranged inside the void 218 as illustrated in neutron source 700 of FIG. 7.

It should, however, be noted that the cold neutron source may in other arrangements be arranged outside the void, such as in the moderator or the reflector. The hot or cold neutron source may, for example, be arranged within the peak flux position within the reflector region.

Neutrons ejected from the target may thereby interact with the cold neutron source. After interaction the typically Maxwellian neutron spectral distribution may thereby be shifted to lower energies by neutrons slowing down through inelastic scattering processes with the cold neutron source.

The act of installing a beam generator arranged to generate a beam directed into the chamber, may comprise installing a spallation neutron source for providing the beam of the beam generator. The spallation neutron source may, for example, be arranged to produce protons and to accelerate these protons to energies above a threshold of 120 MeV. The spallation neutron source may be referred to as a spallation accelerator. Efficient spallation processes may thereby be achieved by directing the beam of protons on a target. The target may for such processes be referred to as a spallation target. An efficient generation of neutrons may be provided by the spallation processes.

To achieve an efficient spallation process, the act of installing a target may comprise installing a target, i.e. a spallation target, comprising a material selected from the group consisting of mercury, tantalum, lead, liquid lead-bismuth alloy, tungsten, rhenium, or alloys of these.

The act of installing a beam generator arranged to generate a beam directed into the chamber, may comprise installing a compact neutron source for providing the beam of the beam generator.

The act of installing a target may then comprise installing a target comprising a material selected from the group consisting of beryllium or lithium.

It should be noted that spallation sources allow for us to produce the highest neutron fluxes. They are more expensive than the compact sources, in particular compact sources below 10 MeV proton energy, which require lesser shielding. The compact sources are cheaper to build and operate than spallation sources. With state of the art target-moderator-reflector design they may deliver sufficient amount of neutrons for a number of uses, where it is then not desirable to use the more intense, but also more expensive spallation sources.

The beam generator may be arranged to provide a pulsed beam. An efficiently pulsed neutron source may thereby be provided.

For a pulsed neutron source, the repetition rate of the proton acceleration is an important parameter to be considered. The pulsed nature of the neutron sources may offer an advantage for experiments using a time-of-flight, TOF, method, in which the speed of the neutron is measured by timing its flight from the source to the detector.

When a long neutron flight path is used for improved TOF resolution, a slow repetition rate is moreover, desirable to minimize frame overlap, i.e. where fast neutrons from one pulse overlap with the slow neutrons from the previous pulse.

For pulsed neutron sources heat is predominantly produced in the target during the pulses. This allows the heat to dissipate slowly in the period between pulses, so the instantaneous power and neutron flux can be increased.

As non limiting examples, short-pulse spallation neutron sources, typically delivering 1-µs proton pulse widths, have predominated because of the good timing resolution provided for TOF measurements of the neutron energy. The neutron source may further comprise ring structures, i.e. synchrotrons or accumulator/storage rings to provide high proton intensities in such short pulses.

Alternatively, long-pulse sources, typically having 1 or a few ms proton pulse widths, may be used to provide a neutron source with higher power and with high timing resolution provided by other means, for example by mechanical choppers acting on the slow neutron beams In the above description, the moderator, reflector, and/or cold neutron source, have been described to form parts of the provided nuclear reactor neutron source 200. The skilled person in the art, however, realizes that the moderator, reflector, and/or hot, thermal and cold neutron source may be added, according to the present method, to a provided nuclear reactor neutron source not comprising these elements, or as additions to improve the slow neutron production from the target.

The target may be installed together with a surrounding structure that may comprise cooling, reflector and moderator structures and other materials structures in order to adapt to and complement the structures re-used from the nuclear reactor neutron source. To this end, additional elements such as a neutron beam outlet may further be added to the provided nuclear reactor neutron source. Hence, the neutron source may comprise a plurality of neutron beam outlets. The neutron source may further comprise a plurality of targets with a plurality of moderators and reflectors or parts of reflector systems. A plurality of targets may be provided by a plurality of beam generators and the beam of a beam generator may be shared by several targets both simultaneously or alternatively in time, including sending subsequent beam pulses from the beam generator to different targets.

A plurality of experimental stations, and a plurality of neutron beam outlets may be used. Hence, neutron may be provided to the plurality of experimental stations via one or more neutron beam outlets.

It should further be understood that the compact neutron source or part of it can also be placed within in a thermal column, or in the vertical access shaft previously used to access the nuclear reactor core, including changing nuclear fuel elements of the previous nuclear reactor neutrons source.

The act of removing the nuclear fuel element of the nuclear reactor core from the chamber may be temporary or permanent. The temporary or permanent removal of the nuclear fuel element may comprise, but is not limited to, replacing the nuclear fuel element with other structures, which can be dummy containers, space holders to keep out fluids, reflector or moderator materials.

Parts of the old reactor can be re-used or replaced according to case by case analysis. In a swimming pool type of nuclear reactor neutron source, the installed equipment, such as the beam generator, may be placed inside a tube structure, such that a tube arranged to be watertight. Alternatively, the water can be replaced by solid shielding material.

Reflectors, moderators, cold sources also can be re-used, partially re-used, modified or replaced.

The beam generator may alternatively be arranged to generate electromagnetic radiation such as gamma rays.

The beam generator may alternatively be arranged to generate electrons. The electron beam generator may produce neutrons in a target material using the Bremsstrahlung photo-neutron reaction.

The beam generated from the beam generator is generally provided in a vacuum tube of about 5-10 cm diameter a few meters away from the target. To this end, a portion of the chamber surrounding the target may be evacuated such that a vacuum is formed.

The beam generator may be arranged to generate a plurality of beams directed into the chamber.

A plurality of targets may be installed inside the chamber, the targets being arranged to eject neutrons upon impact of the beam such that neutrons are ejected from the targets and emitted from the chamber.

Hence, several targets may be placed inside the chamber. To operate these multiple targets one may use a beam of a beam generator divided between several targets or alternatively one may use several beam generators.

The plurality of targets may be operated simultaneously in time.

A target may be arranged in vicinity to or adjacent to a neutron beam outlet to enhance the neutron output.

The person skilled in the art realizes that the present invention by no means is limited to the preferred embodiments described above. On the contrary, many modifications and variations are possible within the scope of the appended claims.

For example, the act of installing a beam generator may comprise installing the beam generator or a portion of the beam generator inside the chamber, not shown. A neutron source having smaller foot print may thereby be provided.

The provided reactor neutron source may comprise several beam outlets or other shafts, openings for such use. In addition, new beam outlets can be provided by opening by drilling, cutting holes through the enclosure, shielding, chamber, and other structures.

The enclosure of the provided nuclear reactor neutron source may further comprise a thermal column or an access shaft, not shown. The act of installing of the beam generator may then comprise directing the beam into the chamber via the thermal column or the access shaft onto the target. The use of the existing column or an access shaft reduces cost and provides an efficient passage for ions to reach the target.

The moderator of the provided nuclear reactor neutron source may comprise a material selected from the group consisting of $H_2O$, $D_2O$, liquid or solid hydrogen or deuterium, liquid or solid methane, mesithelene, and ice. The reflector of the provided nuclear reactor neutron source may comprise a material selected from the group consisting of graphite, beryllium, steel, tungsten carbide, nickel, tungsten, heavy water, lead, alloys of these.

It should be noted that when target is installed somewhere inside the chamber, e.g. in the nuclear reactor core or inside the moderator or the reflector, the target may be surrounded by an additional target moderator, an additional target reflector and/or an additional target shielding structure, in order to complement pre-existing reflector and/or shielding or to fill a void formed for example by the act of removal disclosed above.

The shielding may be lead, steel, and concrete on the one hand and borated polyethylene on the other. The footprint of the shielding may for example be 2-3 m across for proton energies below 10 MeV, but as the energies go higher, the target shielding needs to increase in size, since the generated fast neutron energies are getting higher.

As noted above, neutron production utilizing a beam generator and a target inside the chamber may be provided without removing all or any nuclear fuel elements of the nuclear reactor neutrons source. An advantage of the method is that a neutron source is provided where the neutrons may be provided by nuclear reactions by the nuclear fuel element or by the target. Hence, a dual source for neutron production is provided. The lifetime of the nuclear reactor based neutron source may be increased as the amount of nuclear fuel needed for producing neutrons is reduced. Less nuclear waste will thereby be produced. The nuclear fuel material may further remain in the chamber reducing cost associated with decommissioning of the nuclear reactor core or parts thereof.

Figure 8:
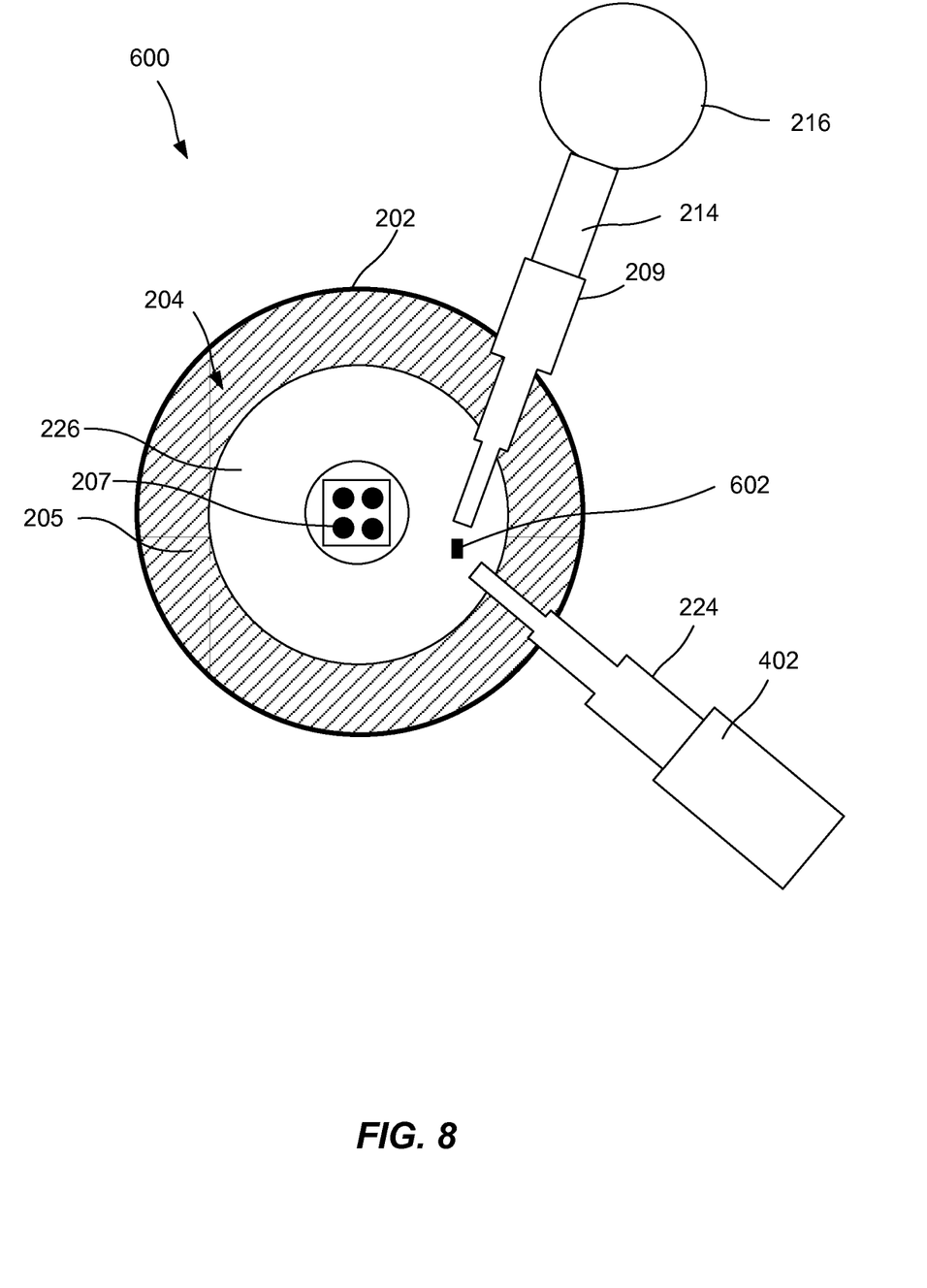
FIG. 8 illustrates a neutron source.

The target may, for example, be installed in the reflector as illustrated in FIG. 8, the advantages are described above. The skilled person in the art, however, realizes that the target or targets may be arranged at other locations in the chamber as discussed above.

Additionally, variations to the disclosed embodiments can be understood and effected by the skilled person in practicing the claimed invention, from a study of the drawings, the disclosure, and the appended claims.

The invention claimed is:

1. A method of providing a neutron source, the method comprising:
   providing a nuclear reactor neutron source, the nuclear reactor neutron source comprising:
      an enclosure delimiting a chamber,
      a nuclear reactor core arranged inside the chamber,
         the nuclear reactor core is configured to produce neutrons from a nuclear fuel element inside the nuclear reactor core;
   installing a beam generator arranged to generate a beam directed into the chamber;
      wherein the beam generator forms part of a spallation neutron source for providing neutrons;
   removing the nuclear fuel element of the nuclear reactor core from the chamber,
      wherein removing the nuclear fuel element forms a void inside the chamber;
   and
   installing, inside the void, a target configured to eject neutrons upon impact of the beam
      wherein impact by the beam onto the target causes neutrons to be ejected from the target and emitted from the chamber through a neutron beam outlet arranged through the enclosure,
      wherein the neutron beam outlet provides a passage for neutrons to leave the enclosure.

2. The method according to claim 1, wherein the chamber of the provided nuclear reactor neutron source further comprises a moderator, and wherein the act of installing the target comprises arranging the target inside the moderator.

3. The method according to claim 2, wherein the moderator of the provided nuclear reactor neutron source comprises a material selected from the group consisting of $H_2O$, $D_2O$, liquid or solid hydrogen or deuterium, liquid or solid methane, mesithelene, and ice.

4. The method according to claim 1, wherein the chamber of the provided nuclear reactor neutron source further comprises a reflector, and wherein the act of installing the target comprises arranging the target inside the reflector.

5. The method according to claim 4, wherein the reflector of the provided nuclear reactor neutron source comprises a material selected from the group consisting of graphite, beryllium, steel, tungsten carbide nickel, tungsten, heavy water, lead, and alloys of these.

6. The method according to claim 1, wherein the provided nuclear reactor neutron source further comprises an additional neutron beam outlet arranged through the enclosure to provide an additional neutron passage for neutrons from the chamber, and wherein the act of installing of the beam generator comprises directing the beam into the chamber via the additional neutron passage onto the target.

7. The method according to claim 1, wherein the enclosure of the provided nuclear reactor neutron source further comprises a thermal column or an access shaft, and wherein the act of installing of the beam generator comprises directing the beam into the chamber via the thermal column or the access shaft onto the target.

8. The method according to claim 1, wherein the act of installing a beam generator comprises installing the beam generator or a portion of the beam generator inside the chamber.

9. The method according to claim 1, wherein the act of installing a target comprises installing a target comprising a material selected from the group consisting of mercury, tantalum, lead, liquid lead-bismuth alloy, tungsten, rhenium, alloys of these, or beryllium and lithium.

10. The method according to claim 1, wherein the installing a beam generator arranged to generate a beam directed into the chamber comprises installing the beam generator to form part of a spallation neutron source for providing neutrons.

11. The method according to claim 1, wherein the installing a beam generator arranged to generate a beam directed into the chamber comprises installing the beam generator to form part of a compact neutron source for providing neutrons.

12. The method according to claim 1, wherein the chamber of the provided nuclear reactor neutron source further comprises a hot or cold neutron source, and wherein the act of installing a target comprises arranging the target adjacent to the hot or cold neutron source.

\* \* \* \* \*